United States Patent
Bos et al.

(10) Patent No.: US 9,331,861 B2
(45) Date of Patent: May 3, 2016

(54) ETHERNET RING NODE WITH IMPROVED RECOVERY TIME AFTER A LINK FAILURE

(75) Inventors: Juergen Bos, Cologne (DE); Stefan Behrens, Herzogenrath (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 154 days.

(21) Appl. No.: 13/994,325

(22) PCT Filed: Dec. 17, 2010

(86) PCT No.: PCT/EP2010/070140
§ 371 (c)(1),
(2), (4) Date: Jun. 14, 2013

(87) PCT Pub. No.: WO2012/079651
PCT Pub. Date: Jun. 21, 2012

(65) Prior Publication Data
US 2013/0258855 A1 Oct. 3, 2013

(51) Int. Cl.
| | |
|---|---|
| H04L 12/18 | (2006.01) |
| H04L 12/751 | (2013.01) |
| H04L 12/703 | (2013.01) |
| H04L 12/437 | (2006.01) |
| H04L 12/721 | (2013.01) |

(52) U.S. Cl.
CPC .......... *H04L 12/1886* (2013.01); *H04L 12/185* (2013.01); *H04L 12/1868* (2013.01); *H04L 12/437* (2013.01); *H04L 45/02* (2013.01); *H04L 45/28* (2013.01); *H04L 45/32* (2013.01)

(58) Field of Classification Search
None
See application file for complete search history.

(56) References Cited

U.S. PATENT DOCUMENTS

| | | | | |
|---|---|---|---|---|
| 7,599,315 | B2 * | 10/2009 | Cornet et al. | 370/258 |
| 7,733,810 | B2 * | 6/2010 | Denecheau et al. | 370/258 |
| 8,345,540 | B2 * | 1/2013 | Rollins | 370/222 |
| 8,477,660 | B2 * | 7/2013 | Lee et al. | 370/258 |
| 8,570,858 | B2 * | 10/2013 | Song | 370/221 |
| 8,670,305 | B2 * | 3/2014 | Peng et al. | 370/225 |
| 8,891,535 | B2 * | 11/2014 | Angst et al. | 370/400 |
| 2006/0245351 | A1 * | 11/2006 | Pande et al. | 370/216 |
| 2008/0095047 | A1 * | 4/2008 | Skalecki et al. | 370/225 |
| 2008/0259784 | A1 * | 10/2008 | Allan et al. | 370/216 |
| 2009/0213855 | A1 * | 8/2009 | Xu | 370/390 |
| 2009/0265476 | A1 * | 10/2009 | Bahls | 709/231 |
| 2010/0054246 | A1 * | 3/2010 | Shah et al. | 370/390 |
| 2011/0280242 | A1 * | 11/2011 | Kugel et al. | 370/392 |
| 2012/0092983 | A1 * | 4/2012 | Song | 370/217 |
| 2012/0120950 | A1 * | 5/2012 | Mentze et al. | 370/389 |
| 2014/0269433 | A1 * | 9/2014 | Allan et al. | 370/255 |

* cited by examiner

*Primary Examiner* — Noel Beharry
*Assistant Examiner* — Ning Li
(74) *Attorney, Agent, or Firm* — Rothwell, Figg, Ernst & Manbeck, p.c.

(57) ABSTRACT

The invention relates to an Ethernet ring node (100) comprising a plurality of ports including at least two ring ports and at least one non-ring port. The Ethernet ring node comprises a multicast list including information on which port multicast traffic belonging to a multicast group should be sent. A control unit is provided configured to control a traffic distribution of multicast traffic to the different ports of the Ethernet ring node based on the information provided in the multicast list. Furthermore, a detector is provided detecting a topology change of the Ethernet ring in which the Ethernet ring node is provided. When such a topology change is detected, all multicast traffic is transmitted to the at least two ring ports for a predefined period of time, and multicast traffic transmitted to the non-ring ports is transmitted in accordance with the information provided in the multicast list.

9 Claims, 6 Drawing Sheets

ETHERNET RING NODE WITH IMPROVED RECOVERY TIME AFTER A LINK FAILURE

CROSS-REFERENCE TO RELATED APPLICATION(S)

This application is a 35 U.S.C. §371 National Phase Entry Application from PCT/EP2010/070140, filed Dec. 17, 2010, designating the United States, the disclosure of which is incorporated by reference herein in its entirety.

TECHNICAL FIELD

The present invention relates to an Ethernet ring node transmitting multicast traffic and relates to a method for controlling multicast traffic in the Ethernet ring node.

BACKGROUND

Carrier Ethernet Networks have—amongst other requirements—the requirement to provide high availability. This is reached by avoiding outage times of the Carrier Ethernet Network Elements and Components as well as by network protection mechanisms against link failures and node failures. In the latter case, fast restoration times are necessary to be able to run Ethernet as Carrier Ethernet.

In traditional Ethernet LAN (Local Area Network) environments, Spanning Tree Protocol (STP) has been used for this purpose, guaranteeing loop-free topologies and, in case of redundant links, provide failover using previously un-used LAN segments but its slow convergence has made it nearly obsolete. With Rapid Spanning Tree (RSTP) things have improved and sub-second failover times could be reached.

However, for certain sensitive traffic types such as real-time gaming traffic or IPTV (Internet Protocol Television) traffic, even RSTP is perceived as being too slow from a convergence time point of view and the ITU-T G.8032 standard for fast Ethernet Ring protection has been developed. G.8032 promises <50 msec failover times on link level in certain situations.

A G.8032 Ethernet ring has one ring protection link (RPL), which is blocked in normal operation, thus avoiding loops. In case of a failure on a link or port, signal failure (SF) messages are multicast to inform other ring nodes of the failure condition. On protection switching, the RPL is unblocked forming a new topology and thus a new traffic pattern on the ring.

Multicast transmission is a technology of delivering information to a group of users or a group of destination computers simultaneously in a single transmission from a source to the different destinations, these destinations building a multicast group.

To be able to efficiently handle multicast traffic many switches in a carrier Ethernet environment support the IGMP snooping functionality as disclosed in "Considerations for Internet Group Management Protocol (IGMP) and Multicast Listener Discovery (MLD) Snooping Switches," Network Working Group Request for Comments 4541". IGMP snooping is a feature that allows a layer to switch to "listening in" on the layer 3 IGMP conversation (IGMP report and IGMP leave messages) between hosts and routers by processing the layer 3 JUMP packets sent in a multicast network as disclosed in further detail in "Host Extensions for IP Multicasting (IGMPv1), Network Working Group Request for Comments 1112" and "Internet Group Management Protocol, Version 2 (IGMPv2), Network Working Group Request for Comments 2236". Though violating the OSI (Open Systems Interconnection) layer responsibilities these layers 3 can be used to prevent hosts on a local network from receiving traffic from a multicast group that have not explicitly joined on a per port basis.

In this context switches build a knowledgeable table (the IGMP registration table) in order to know on which port which multicast traffic, i.e. which multicast group traffic of a multicast group, has to be sent.

Figure 1:
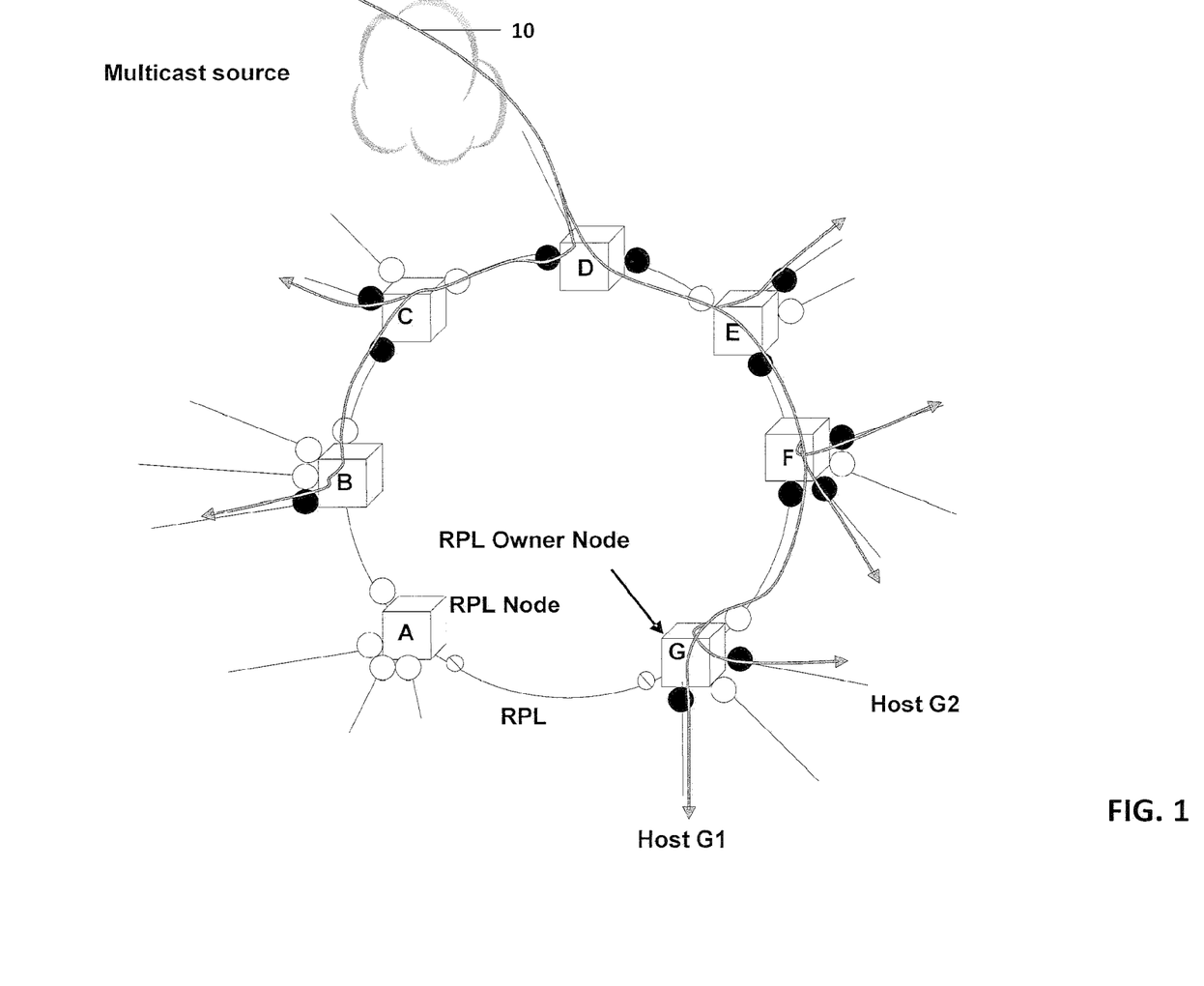
FIG. 1 shows an Ethernet ring with multicast traffic and IGMP snooping.

In FIG. 1 an Ethernet ring is shown where the switches run G.8032 and IGMP snooping. Since IGMP Snooping is enabled, multicast traffic is only sent out on those ports that are interested in multicast traffic. Referring to FIG. 1, this means that the fully shaded circles represent the ports registered in the IGMP registration table as a port that has joint a multicast group. Multicast traffic for a specific multicast group will be forwarded on this board. The other empty circles represent ports registered in the IGMP registration table as a port that does not forward multicast traffic. Furthermore, in FIG. 1 between the ring nodes A and G two ports are blocked due to G.8032, the connection between nodes A and G representing the ring protection link RPL. In the embodiment shown in FIG. 1 multicast traffic from a multicast source 10 is transmitted through the fully shaded circles to the different hosts inter alia to host G1 and G2. By way of example, if hosts G1 and G2 have sent IGMP membership report messages to the multicast source, the respective ports on switch G are registered in the IGMP registration table of switch G. If the traffic running over an Ethernet ring is multicast traffic, then the ITU-T G.8032 standard mentioned above does not describe how to handle the IGMP registration table during a topology change in the ring, e.g. when a link failure or a recovery occurs.

Figure 2:
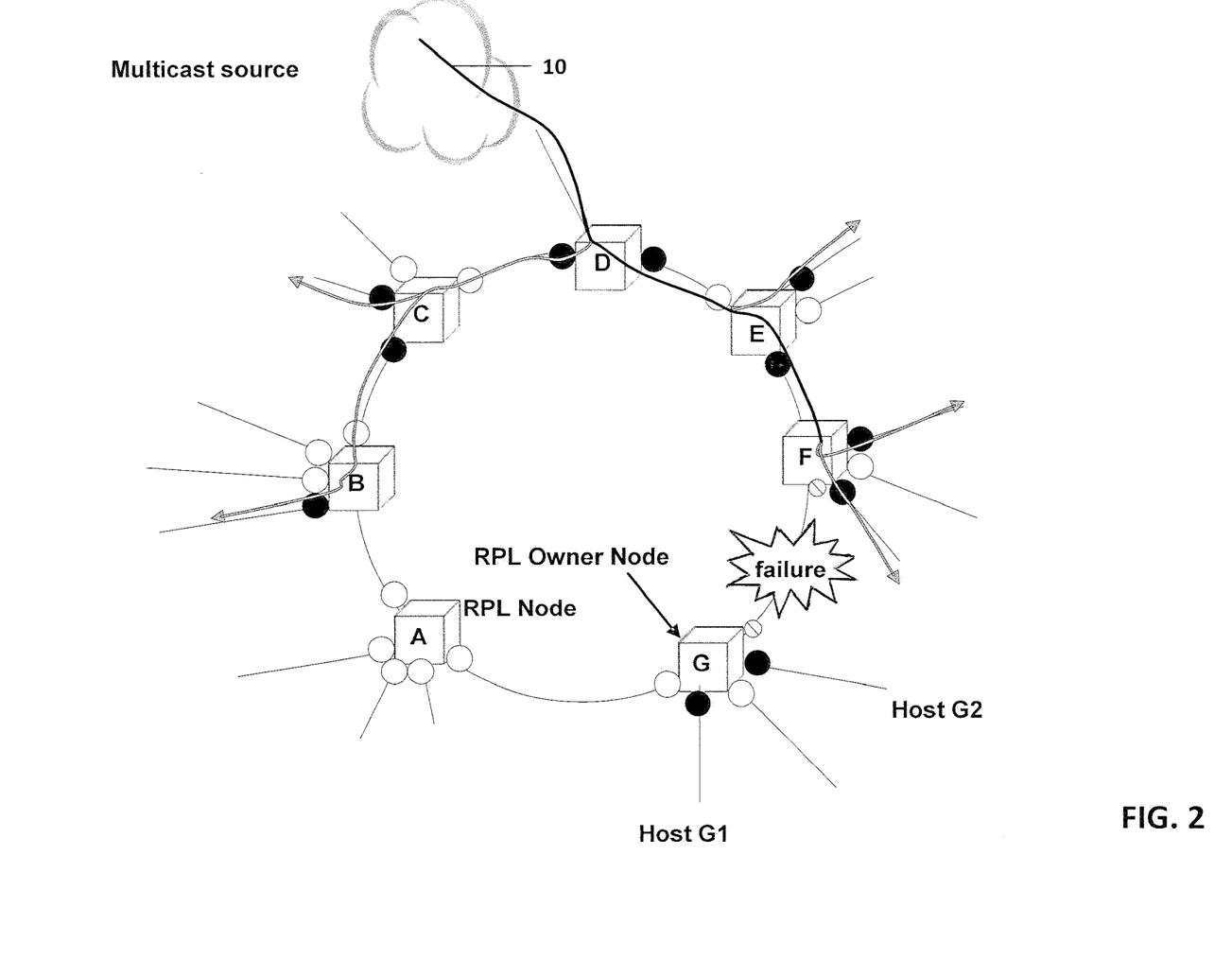
FIG. 2 shows the Ethernet ring of FIG. 1 with multicast traffic and IGMP snooping after a link failure as known in the art.

FIG. 2 shows an example of a situation after a link failure in an Ethernet ring between nodes F and G, where the switches run G.8032 and IGMP snooping. The ring protection link blocked in FIG. 1 is now unblocked. If the IGMP registration table is not changed after the failure, then black holing (loss of traffic) of traffic might occur, since the hosts G1 and G2 will not receive multicast traffic any longer.

G.8032 node A does not have an entry in its IGMP registration table on the port direction G.8032 node G. Thus, no multicast traffic will be forwarded on this ring port. Hosts G1 and G2 have received the requested multicast traffic via G.8032 node F before the link failure. Now, they would need to receive this traffic via G.8032 node A. In order to update the IGMP registration tables of the involved nodes, host G1 and G2 would need to issue a new IGMP report to receive again the multicast traffic via the new topology.

Other protection protocols have been described how to handle multicast traffic after a 30 topology change. By way of example, it is described in "Cisco 1OS Software Configuration Guide—Release 12.1 (12c) EW: Understanding and Configuring IGMP Snooping Filtering" to either flood multicast traffic on all or selected VLAN ports dependent on node configuration: here, all IGMP registrations are deleted and multicast traffic will be flooded on selected ports for a configurable amount of time. Flooding will continue until the mechanism to prune multicast traffic from links that do not contain a multicast listener is kicking in via IGMP snooping. In an alternative, multicast traffic is not flooded at all. In this embodiment, traffic outages occur until the interested hosts send new IGMP report messages.

Both options have disadvantages:

For the first option, traffic will be flooded unnecessarily and since this happens during a failure event, the network is even more sensitive to high amounts of traffic.

For the second option, the traffic outage on service level is well above the failover times of the transport network—which might be ~50 msec in case of G.8032.

IGMP Query Solicitation is a feature that allows switches to force an immediate general IGMP Query by the Multicast Source Router.TR-1 01, as disclosed in "TR-1 01, Migration to Ethernet Based DSL Aggregation"

Upon detecting topology changes (e.g. VLAN membership change, port being disabled by STP or network port changing state), the Access Node MUST be able to issue an IGMP proxy query solicitation, i.e. an IGMP Group Leave with group address '0.0.0.0'. This will indicate to the BNG (=Multicast Source) it immediately needs to send Group Specific queries, which will populate the L2 multicast filters in the Access Node, in order to speed up network convergence.

The problem with IGMP Query solicitation feature is that
1. the feature must be available in the affected switches
2. It still takes at least 1 second to re-establish the multicast path All of the above stated existing solutions either lead to unnecessary multicast traffic flooding or
black-holing or
a multicast service restoration time not in the range of 50 ms as G.8032 provides on physical connectivity level.

SUMMARY

Accordingly, a need exists to control multicast traffic in case of a topology change in an efficient way while keeping the multicast service restoration time in the range of about 50 ms and while avoiding unnecessary traffic.

This need is met by the features of the independent claims. In the dependent claims, preferred embodiments of the invention are described.

According to a first aspect of the invention an Ethernet ring node is provided comprising a plurality of ports, the ports including at least two ring ports among the plurality of ports and at least one non-ring port and each ring port is configured to connect the Ethernet ring node to an adjacent Ethernet ring node. The Ethernet ring node furthermore comprises a multicast list including information on which port multicast traffic belonging to a multicast group should be sent. Furthermore, a control unit is provided configured to control a traffic distribution of the multicast traffic to the different ports of the Ethernet ring based on the information provided in the multicast list. Additionally, a detector is provided configured to detect a topology change of the Ethernet ring in which the Ethernet ring node is provided. When the detector detects such a topology change, the control unit transmits all multicast traffic to the at least two ring ports for a predetermined period of time and transmits multicast traffic in accordance with the information provided in the multicast list to the at least one non-ring port. By transmitting the arriving multicast traffic to the at least two ring ports for a predetermined period of time, it can be assured that when a topology change has been detected, the multicast traffic will be forwarded to all the ring nodes assuring that the multicast traffic will arrive at the different hosts. However, the multicast traffic is, in case of a topology change, not flooded over all ports of the ring node, but just to the ring ports reducing the traffic to a required minimum. The control unit is able to differentiate ring ports and non-ring ports. If no topology change is detected, the multicast traffic is transmitted in accordance with the information provided in the multicast list. Only when a topology change in the Ethernet ring is detected by the ring node, multicast traffic is "flooded" to the ring ports of the Ethernet ring node for a predefined period of time.

In one embodiment it is possible that the control unit is configured to clear the information in the multicast list given for the at least two ring ports of the Ethernet ring node when the detector has detected the topology change. The control unit can be further configured to leave information given for the at least one non-ring port of the Ethernet ring node unchanged. This means that the Ethernet ring node is able to organize its multicast list on a per port basis allowing to distinguish between ring ports and non-ring ports.

Furthermore, it is possible that the Ethernet ring node is configured to apply the Ethernet ring protection switching protocol wherein the multicast list is a registration table of the Internet group management protocol, IGMP, snooping functionality. By way of example, the Internet group management protocol can be the G.8032 standard. However, other ring protection mechanisms in combination with a functionality allowing to differentiate between ring ports and non-ring ports may be used.

One possibility for the detector to detect a topology change is when the detector detects a flushing of a unicast filter database of the Ethernet ring node. If a flushing of a unicast filter database is detected, it can be deduced that a topology change in the Ethernet ring has occurred. This flushing can then be used as a trigger to transmit all multicast traffic to the at least two ring ports for said predefined period of time. A failure of a ring segment need not necessarily lead to a topology change of the Ethernet ring. By way of example, if the failure occurs on the ring protection link, then no topology change of the traffic occurs, as this link was closed for normal traffic. The trigger event for the mechanism described above can be the detection of the flushing of the unicast filter database. However, it should be understood that other mechanisms might be used to detect a topology change, e.g. a port may detect a physical link loss and report this to the detector.

When a predefined period of time after which the topology change has been detected, has lapsed, the control unit can be configured to transmit multicast traffic to the ring ports and to the at least one non-ring port using the information in the multicast list. The predefined time period is preferable configurable and as a default time two IGMP query intervals may be used. Within this time period it is assumed that the IGMP registration table for the ring ports can be built up again. This means that after the expiration of this time period, the node will forward multicast traffic over the ring ports according to the newly learned multicast list.

The invention furthermore relates to a method for controlling multicast traffic in an Ethernet ring node, the Ethernet ring node comprising a plurality of ports, the ports including at least two ring ports among the plurality of ports. Each ring port is configured to connect the Ethernet ring node to an adjacent Ethernet ring node and a multicast list is provided including information on which port multicast traffic belonging to a multicast group should be sent. The method comprises the steps of controlling a traffic distribution of multicast traffic to the different ports of the Ethernet ring node based on the information provided in the multicast list. Furthermore, a topology change of the Ethernet ring in which the Ethernet ring node is provided is detected and when the topology change has been detected, all multicast traffic arriving in the Ethernet ring node is transmitted to the at least two ring ports for a predefined period of time, wherein the multicast traffic is transmitted to the at least one non-ring port in accordance with the information given in the multicast list. The described method helps to assure that in case of a topology change multicast traffic is transmitted to all of the ring nodes from where the multicast traffic can be transmitted to the different members of the multicast group to which the multicast traffic belongs to.

BRIEF DESCRIPTION OF THE DRAWINGS

The invention will be described in further detail with reference to the accompanying drawings, in which.

DETAILED DESCRIPTION OF THE DRAWINGS

Figure 3:
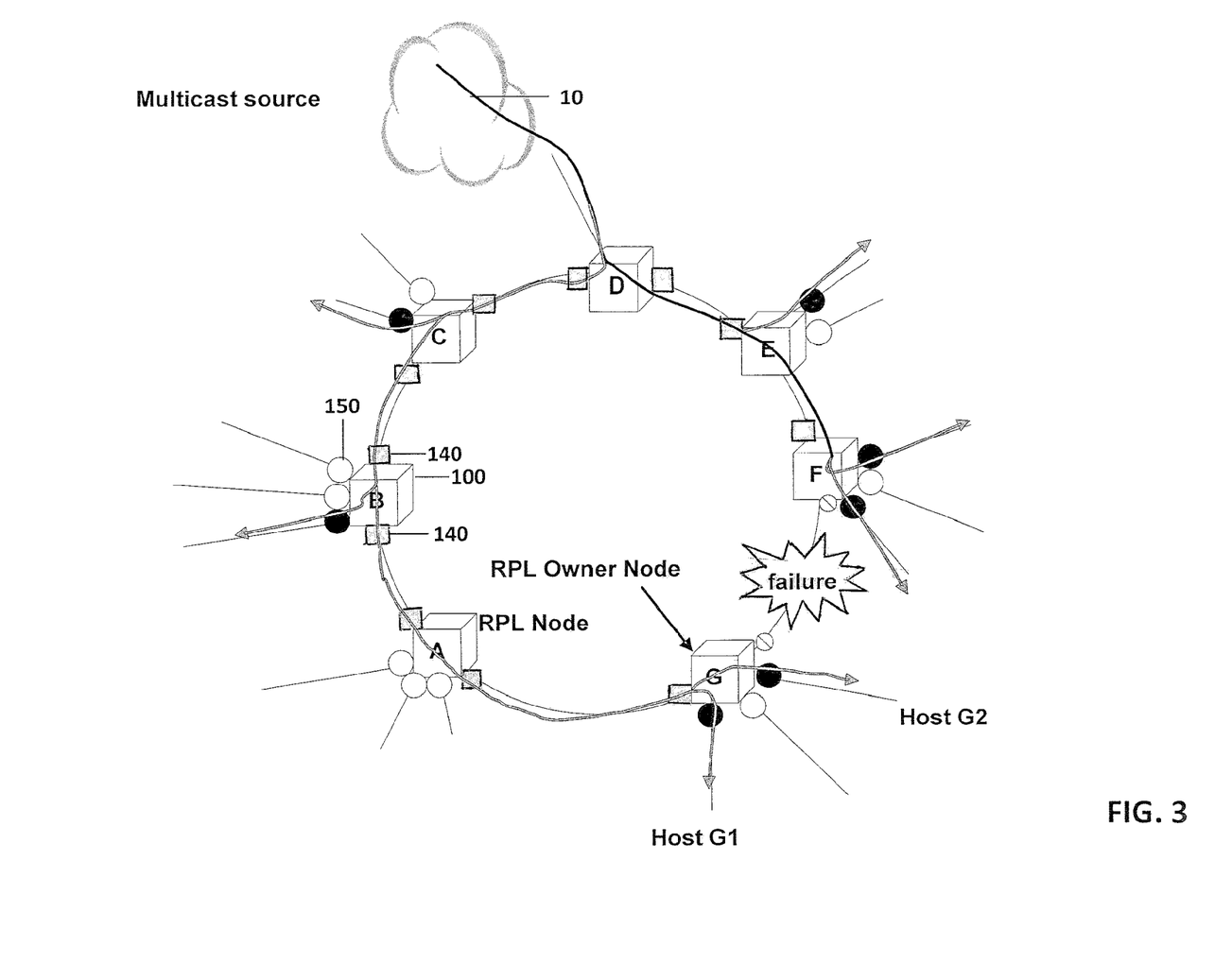
FIG. 3 shows an Ethernet ring with handling of multicast traffic according to the invention.

In FIG. 3 an embodiment of an Ethernet ring node will be described where multicast traffic from a multicast source 10 will be transmitted to the different hosts with very short traffic outage times after a link failure. The different Ethernet ring nodes A to G build an Ethernet ring, the embodiment shown in FIG. 3 showing the handling directly after a link failure between nodes F and G. Ring node B, shown as reference numeral 100 in the embodiment of FIG. 3, has, before the failure, not seen a need to forward multicast traffic on the ring port to node A. Due to the link failure event between switches G and F the G.8032 signaling of the failure has led to a unicast FDB table flush in switch B. At this point in time, switch B now floods multicast traffic on both ring ports 140 and thus, multicast traffic will be sent to node A. Since all the other nodes act in a similar way, also node A will forward multicast traffic on both ring ports.

In the embodiment shown in FIG. 3 the ring ports that flood multicast traffic are symbolized by the rectangular ports having reference numeral 140, whereas the non-ring ports are described by reference numeral 150. A ring port is a port which has no direct connection to a host, whereas the non-ring ports connect the ring node to a host. As an effect of the flooding of the ring ports, after the link failure multicast traffic will now further be sent to node G. Since the IGMP registration table for the host ports on node G has not changed, the connected hosts G1 and G2 will still receive the requested multicast traffic and only minimal traffic outages, comparably to the unicast traffic outages (approximately 50 ms for G.8032) will occur.

In the embodiment shown in FIG. 3 there is an interworking behaviour of G.8032 nodes with the IGMP snooping feature to smoothen the negative impact of failure events especially on multicast traffic. The Ethernet ring nodes will react on topology changes in the ring by clearing the IGMP registration table only for the ring ports immediately after the topology change event and multicast traffic is flooded over both ring ports for a configurable period of time. For all other ports, the non-ring ports, the IGMP registration table corresponding to the multicast list stays unchanged compared to the registration table before the topology change. With this handling the multicast list for ports to the multicast interested hosts stays intact and thus no additional service disruption times for multicast services take place.

In the G.8032 enabled ring shown in FIG. 3, link failures such as the failure between nodes F and G are treated by unblocking the previously blocked ring port and blocking the failed link within 50 ms conversion time.

From an IGMP snooping point of view the IGMP registration table for all ports that are non-ring ports is not affected by a link failure in the ring. However, due to the topology change in the ring, multicast traffic might not reach all switches due to some ring ports that might not be registered in the IGMP registration table. Each of the nodes shown in FIG. 3 is able to organize its IGMP registration table on a per port basis, as each node should be able to distinguish between ring ports and non-ring ports. Now, with the IGMP snooping functionality switched on, when a failure event has been detected that leads to the flushing of a unicast filter database table, the IGMP registration table for the ring ports is cleared and the IGMP registration table for all non-ring ports is not changed. All multicast traffic is flooded or both ring ports for the configurable predefined period of time.

Figure 5:
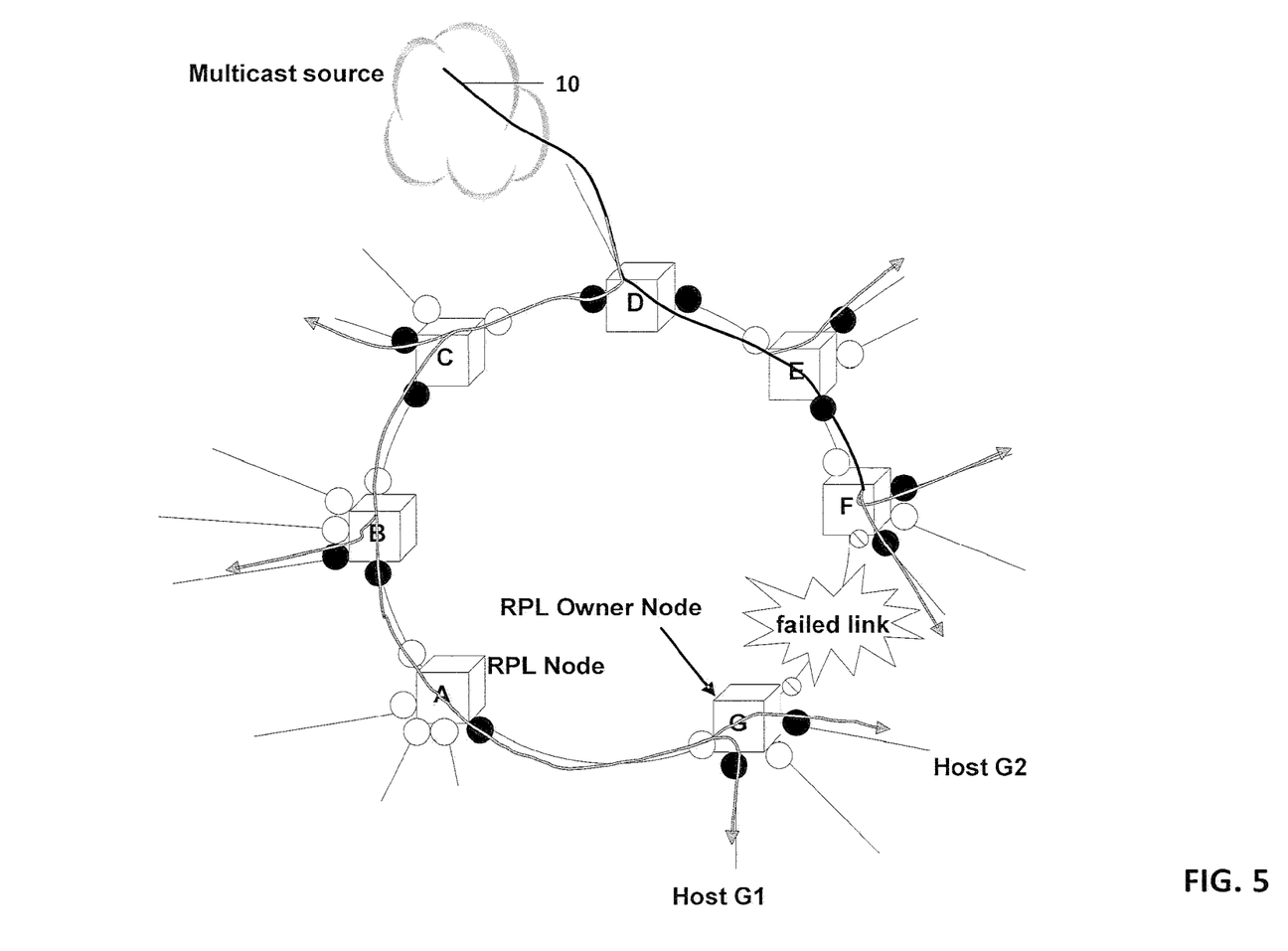
FIG. 5 shows the Ethernet ring of FIG. 3 after the link failure and after expiry of the predefined period of time.

In FIG. 5 the final situation of the Ethernet ring after the link failure and after the predefined period of time has lapsed, is shown. As can be seen multicast traffic from multicast source 10 is transmitted to the hosts G1 and G2 via nodes D, C, B and A before reaching node G. In the embodiment shown in FIG. 5 the multicast flooding on the ring ports has stopped. Within the predefined period of time in which multicast traffic is flooded to the ring ports, the different nodes were able to build new IGMP registration tables using the IGMP snooping functionality.

Figure 4:
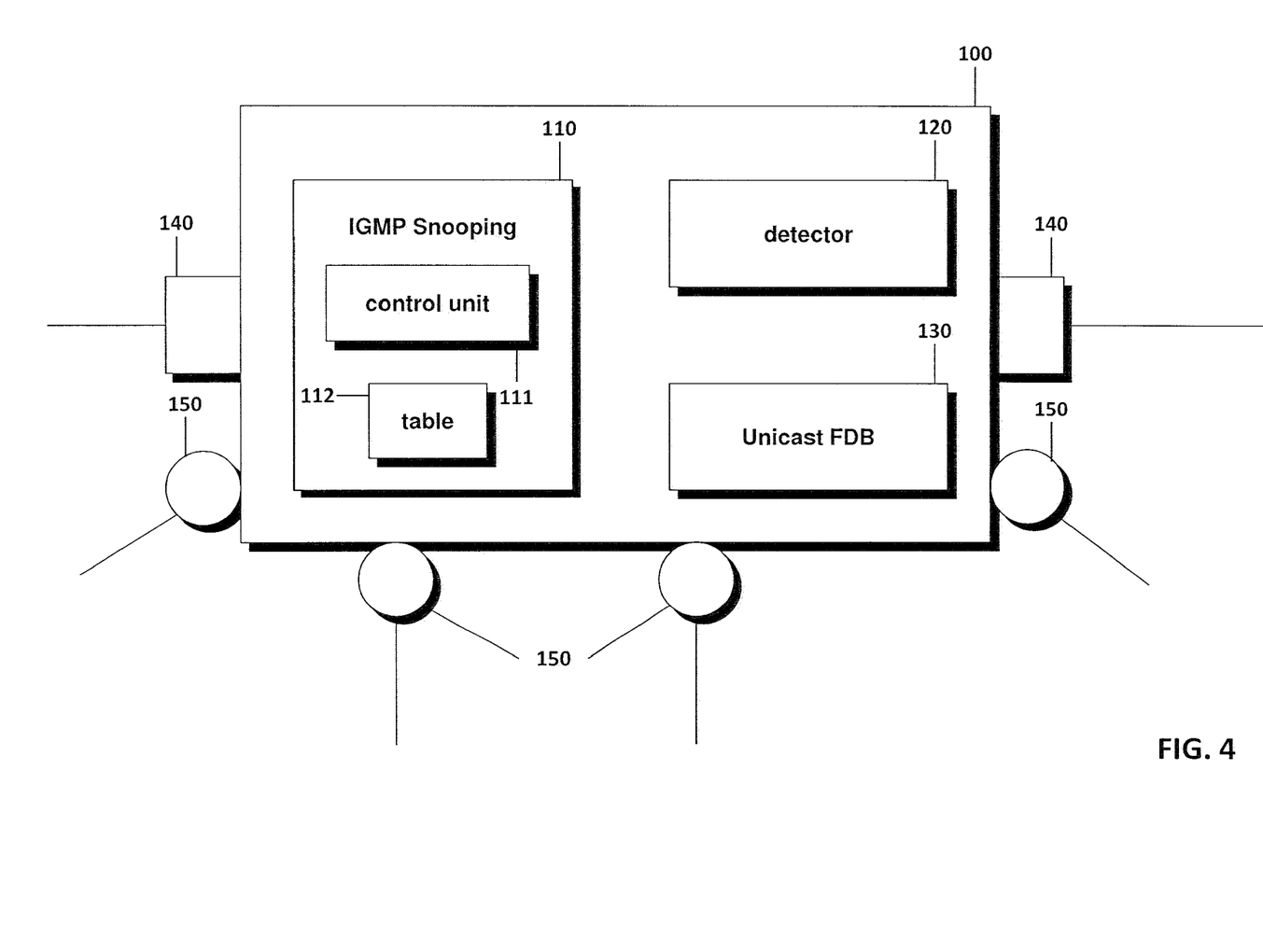
FIG. 4 shows a more detailed view of an Ethernet ring node handling multicast traffic according to the invention.

In FIG. 4 a more detailed view of a ring node 100 is shown. As discussed above, the Ethernet ring node comprises ring ports 140 connecting each ring node 140 to an adjacent Ethernet ring node. The Ethernet ring node 100 furthermore comprises the non-ring ports 150. The Ethernet ring node furthermore comprises the IGMP snooping functionality 110. The IGMP functionality 110 comprises a control unit 111 controlling the traffic distribution of the multicast traffic to the different ports. The control unit 111 uses registration table 112 including the information on which port different multicast traffics should be sent to. By way of example, the table 112 can be the IGMP registration table. The Ethernet ring node furthermore comprises a detector 120 detecting a topology change of the Ethernet ring in which the ring node 100 is provided. In the embodiment shown the trigger event for detecting a topology change of the Ethernet ring is the flushing of a unicast filter database 130. The flushing of the unicast filter database 130 occurs when a "real" topology change is detected, "real" meaning a topology change, which influences the multicast traffic. By way of example, a failure of the ring protection link, RPL, would not lead to a "real" topology change, as no traffic is transmitted via the RPL. As a consequence, the detector detects the flushing of database 130 and if the flushing is detected, the detector 120 informs the IGMP snooping functionality 110, where the control unit initiates the flooding of all multicast traffic to both ring ports, the control unit furthermore clearing the table content for the ring ports while keeping the table content for the non-ring ports unchanged.

The units shown in FIG. 4 may be implemented as software code portions running on one or more processors of the network node. The units may also be implemented as hardware or a combination of hardware and software. For the sake of clarity only the components of an Ethernet ring node are described which are necessary for the understanding of the present invention. Other functional components were omitted.

Figure 6:
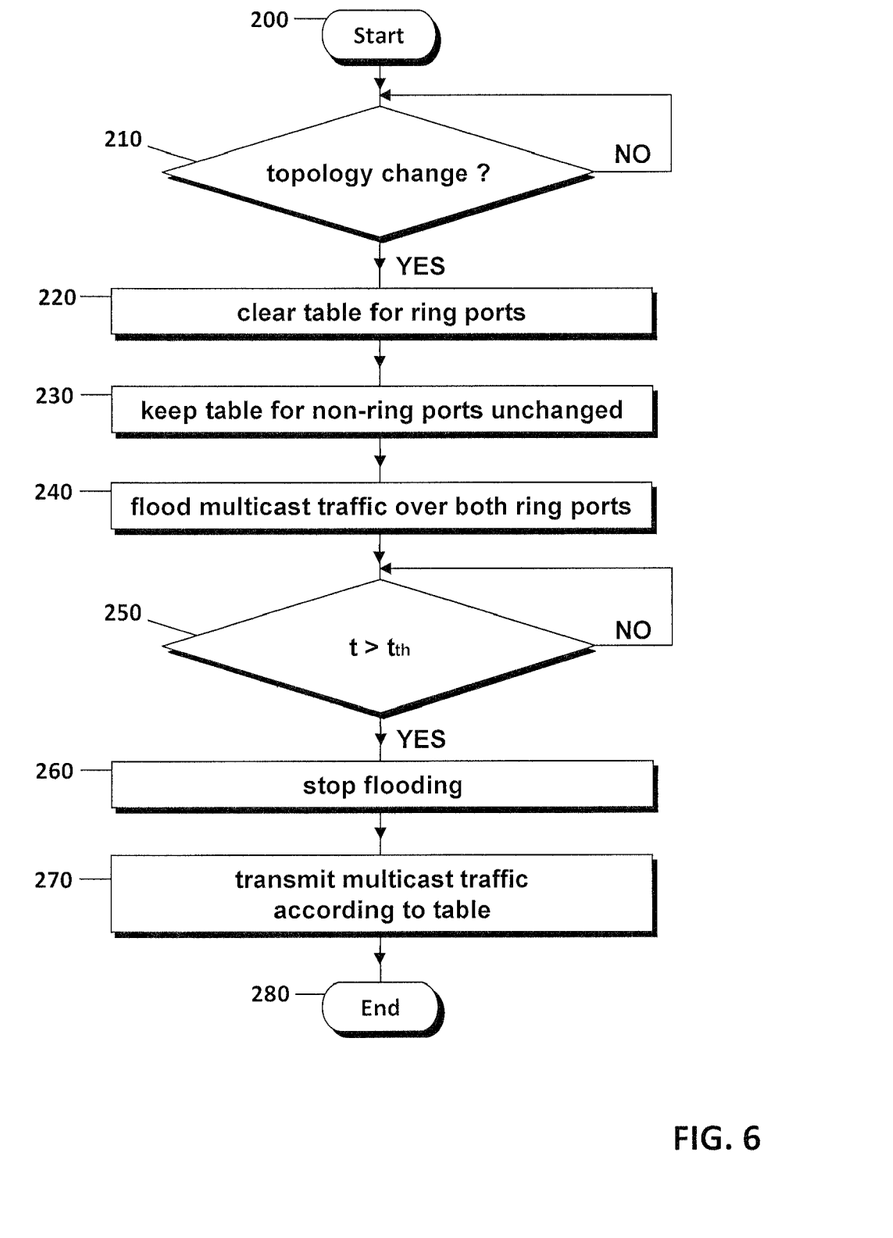
FIG. 6 shows a flow-chart comprising the steps for efficiently handling a link failure in an Ethernet ring node.

In FIG. 6 the different steps for controlling multicast traffic are summarized. The method starts in step 200. Under normal operation, i.e. when no topology change is detected, each node distributes multicast traffic based on the information given in the multicast list/IGMP registration table (not shown in FIG. 6). If in step 210 a topology change is detected by detector 120 shown in FIG. 4, the information is provided to the IGMP snooping functionality where the table for the ring ports is cleared in step 220. At the same time the table 112 for the non-ring ports is kept unchanged (step 230). Additionally, in step 240 all multicast traffic arriving in a ring node is flooded over both ring ports. In the embodiment shown in FIG. 6 these three steps 220-240 are shown in the displayed order. However, it should be understood that these steps may be carried out nearly simultaneously, or the flooding of the multicast traffic over both ring ports can be initiated and then the table can be controlled as disclosed in steps 220 and 230. Parallel to the flooding, the logic for building the IGMP registration table also for the ring ports is still working. In order to avoid unnecessary traffic, the flooding over both ring ports is only carried out for a predetermined period of time. If the end of the time period is detected ($t>t_{th}$), the flooding is stopped. To this end, in step 250 it is asked whether the time has exceeded a threshold time $t_{th}$ indicating the predefined period of time. As long as the predefined period of time has not lapsed, the flooding is continued. After the predefined period of time has lapsed, the flooding is stopped in step 260. Then, after this period of time the multicast traffic is again transmitted using the information in the registration table.

Summarizing, the present invention improves service restoration times for multicast traffic as multicast traffic outages can well be reduced to an order of unicast traffic outage. Furthermore, less multicast traffic in case of failures occurs, as the flooding of multicast traffic after the detection of a topology change is restricted to the ring ports of the ring node. This avoids the flooding of multicast service traffic on all ports. The reestablishment of multicast traffic paths will be handled by the same entities that handle unicast traffic paths reestablishment keeping the network structures simple and keeping the amount of invested capital low. Additionally, an IGMP query solicitation features disclosed in the introductory part of the present application is not needed. Furthermore, an additional IGMP signaling is not necessary.

The invention claimed is:

1. An Ethernet ring node comprising:
    a plurality of ports, the ports including at least two ring ports among the plurality of ports and at least one non-ring port, each ring port being configured to connect the Ethernet ring node to an adjacent Ethernet ring node,
    a multicast list including information on which port which kind of multicast traffic belonging to a multicast group should be sent,
    a control unit configured to control a traffic distribution of multicast traffic to different ports of the Ethernet ring node based on the information included in the multicast list, and
    a detector configured to detect a topology change of an Ethernet ring in which the Ethernet ring node is provided, wherein, the control unit is configured such that, in response to the detector detecting the topology change, the control unit i) transmits all multicast traffic to the at least two ring ports for a predefined period of time, ii) transmits the multicast traffic to the at least one non-ring port in accordance with the information included in the multicast list, iii) clears the information included in the multicast list for the at least two ring ports of said Ethernet ring node, and iv) leaves the information included in the multicast list for the at least one non-ring port of the Ethernet ring node unchanged.

2. The Ethernet ring node according to claim 1, wherein the Ethernet ring node is configured to apply an Ethernet ring protection switching protocol, wherein the multicast list is a registration table of an Internet Group Management Protocol, IGMP, functionality.

3. The Ethernet ring node according to claim 1, wherein the detector is configured to detect the topology change by detecting a flushing of a unicast filter database of the Ethernet ring node.

4. The Ethernet ring node according to claim 1, wherein the control unit is configured to transmit multicast traffic to the ring ports and to the at least one non-ring port using the information in the multicast list after the predetermined period of time, after which the topology change has been detected, has lapsed.

5. A method for controlling multicast traffic in an Ethernet ring node, the Ethernet ring node comprising a plurality of ports, the ports including at least two ring ports among the plurality of ports, each ring port being configured to connect the Ethernet ring node to an adjacent Ethernet ring node, and a multicast list including information on which port multicast traffic belonging to a multicast group should be sent, the method comprising the steps of:
    controlling a traffic distribution of multicast traffic to different ports of the Ethernet ring node based on the information included in the multicast list, and
    detecting a topology change of an Ethernet ring in which the Ethernet ring node is provided, wherein when the topology change has been detected, all multicast traffic arriving in the Ethernet ring node is transmitted to the at least two ring ports for a predefined period of time, wherein the multicast traffic is transmitted to the at least one non-ring port in accordance with the information included in the multicast list, wherein, when the topology change has been detected, the information included in the multicast list for the at least two ring ports of said Ethernet ring node is cleared, whereas the information included in the multicast list for the at least one non-ring port of the Ethernet ring node is left unchanged.

6. The method according to claim 5, wherein the Ethernet ring node works in accordance with an Ethernet ring protection switching protocol, the multicast list being a registration table of an Internet Group Management Protocol, IGMP, snooping functionality.

7. The method according to claim 5, wherein the topology change is detected by detecting a flushing of a unicast filter database of the Ethernet ring node.

8. The method according to claim 5, wherein all multicast traffic is transmitted to the at least two ring ports for two Internet Group Management Protocol, IGMP, query intervals.

9. The method according to claim 5, wherein multicast traffic is transmitted to the ring ports and the at least one non-ring port of the Ethernet ring node using the information in the multicast list after the predetermined period of time, after which the topology change has been detected, has lapsed.

* * * * *

UNITED STATES PATENT AND TRADEMARK OFFICE
CERTIFICATE OF CORRECTION

PATENT NO. : 9,331,861 B2  
APPLICATION NO. : 13/994325  
DATED : May 3, 2016  
INVENTOR(S) : Bos et al.

Page 1 of 1

It is certified that error appears in the above-identified patent and that said Letters Patent is hereby corrected as shown below:

In the specification,

In Column 1, Line 32, delete "Tree" and insert -- Tree Protocol --, therefor.

In Column 1, Line 61, delete "JUMP" and insert -- IGMP --, therefor.

In Column 2, Line 51, delete "a 30" and insert -- a --, therefor.

In Column 3, Line 7, delete "DSLAggregation"" and insert -- DSL-Aggregation". --, therefor.

In Column 6, Line 33, delete "node 140" and insert -- node 100 --, therefor.

Signed and Sealed this
Second Day of August, 2016

Michelle K. Lee
*Director of the United States Patent and Trademark Office*